(No Model.) 8 Sheets—Sheet 1.
B. F. TEAL.
FLUID PRESSURE BRAKE MECHANISM FOR RAILWAY CARS.
No. 536,106. Patented Mar. 19, 1895.
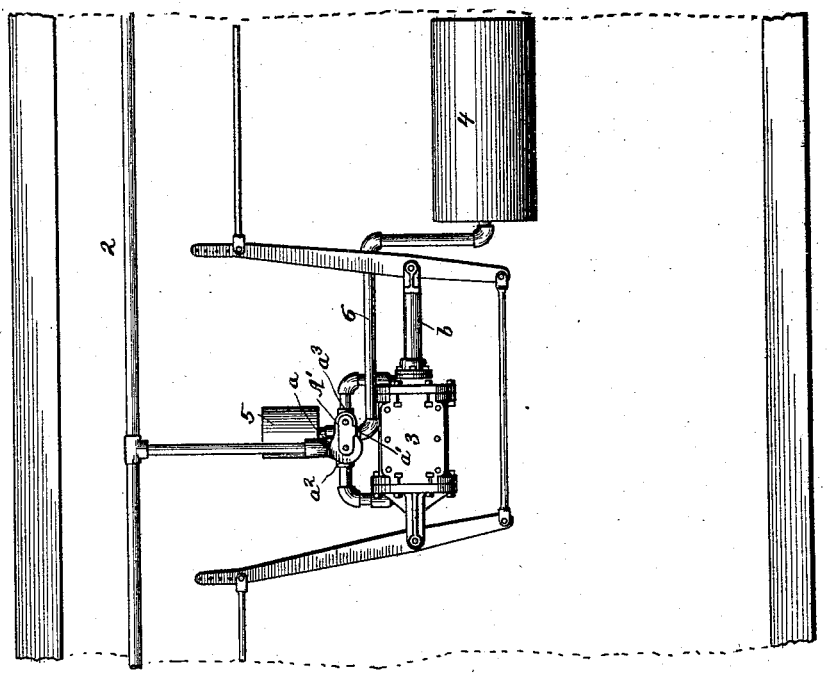
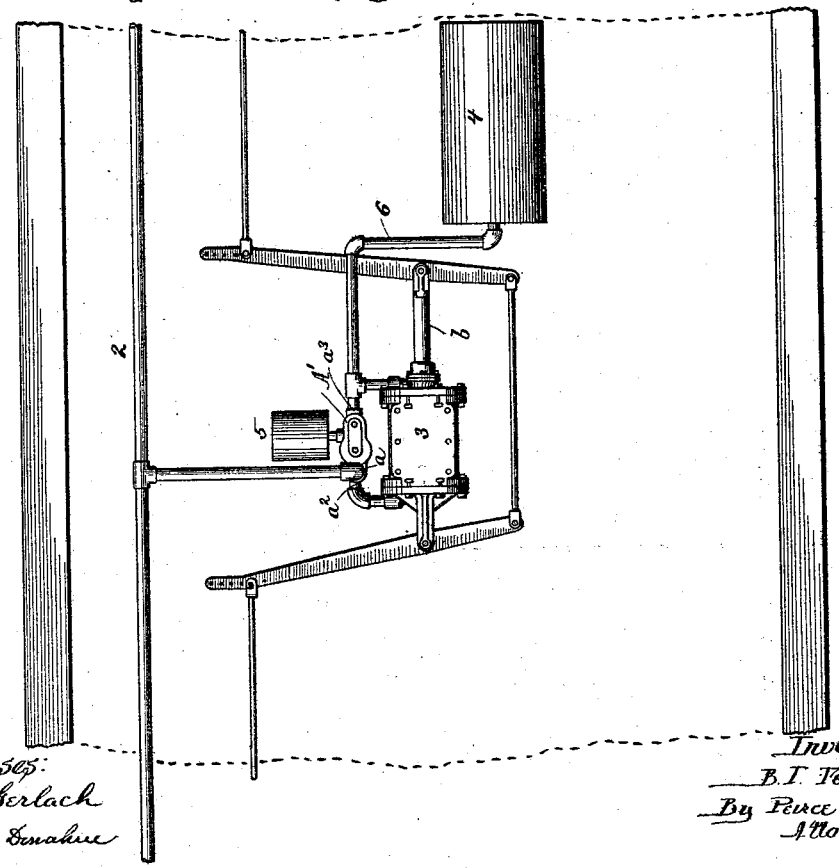
Witnesses:
Fred Gerlach
Grant S. Donahue
Inventor:
B. F. Teal
By Peirce & Fisher
Attorneys.

(No Model.) 8 Sheets—Sheet 2.
B. F. TEAL.
FLUID PRESSURE BRAKE MECHANISM FOR RAILWAY CARS.
No. 536,106. Patented Mar. 19, 1895.
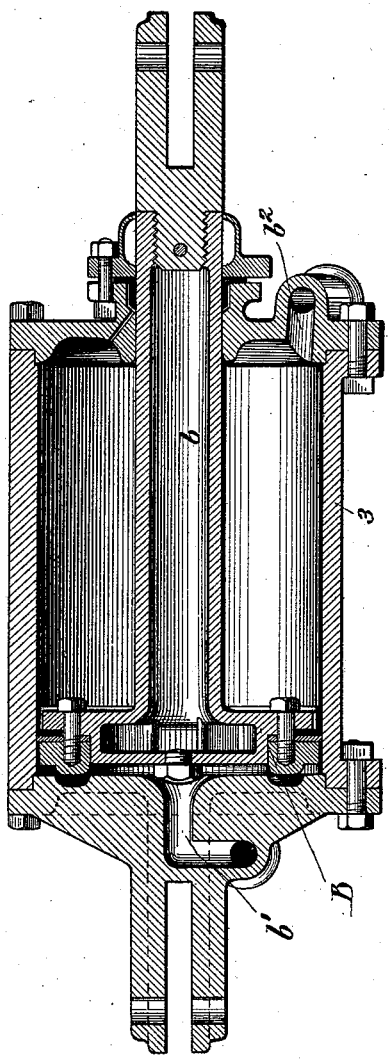
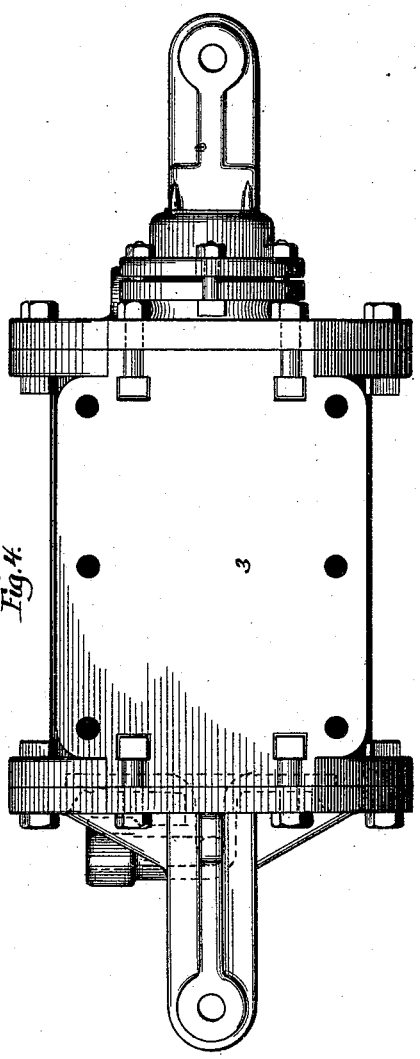
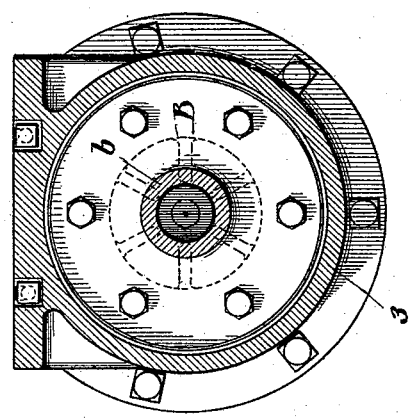

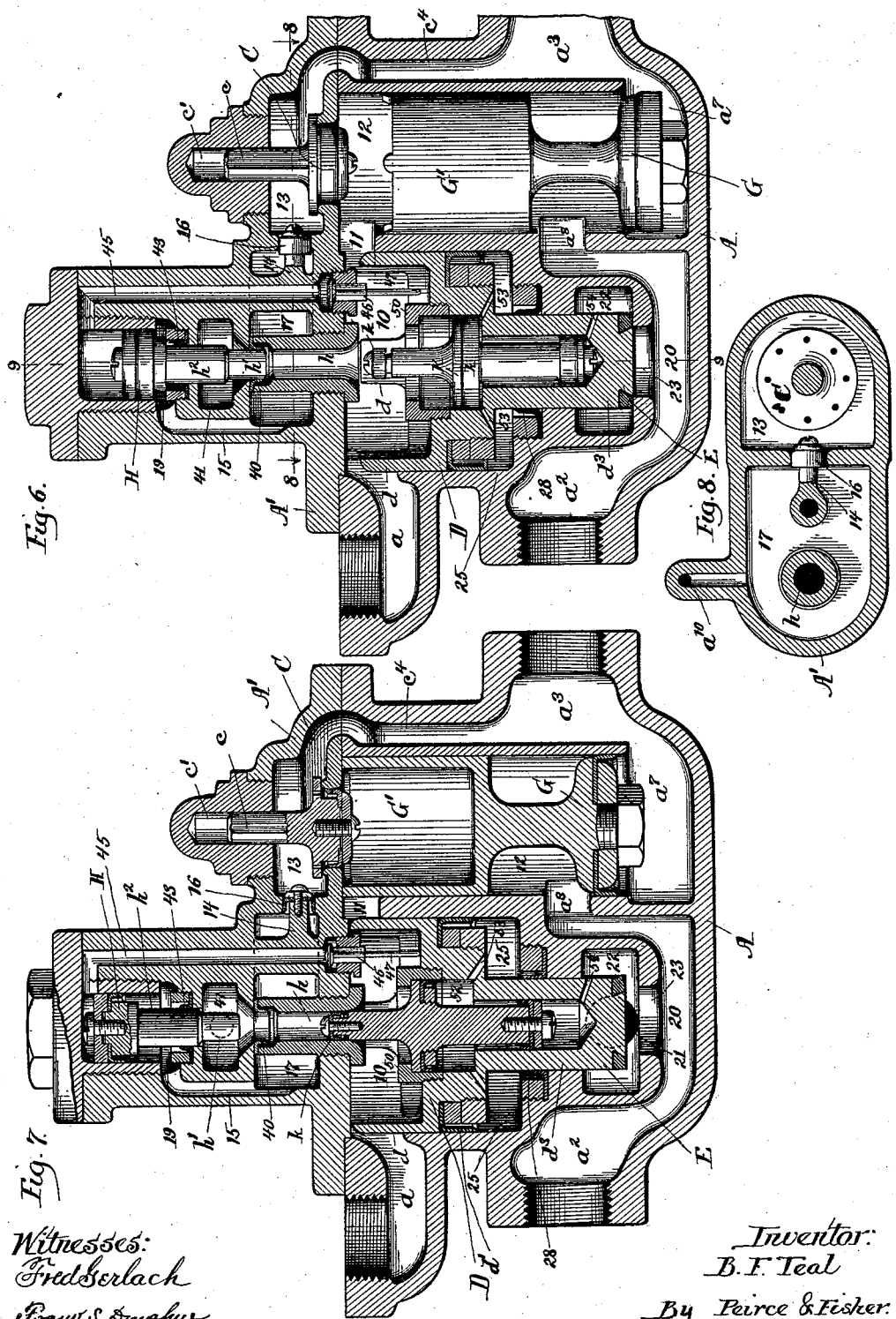

(No Model.) 8 Sheets—Sheet 4.
B. F. TEAL.
FLUID PRESSURE BRAKE MECHANISM FOR RAILWAY CARS.
No. 536,106. Patented Mar. 19, 1895.
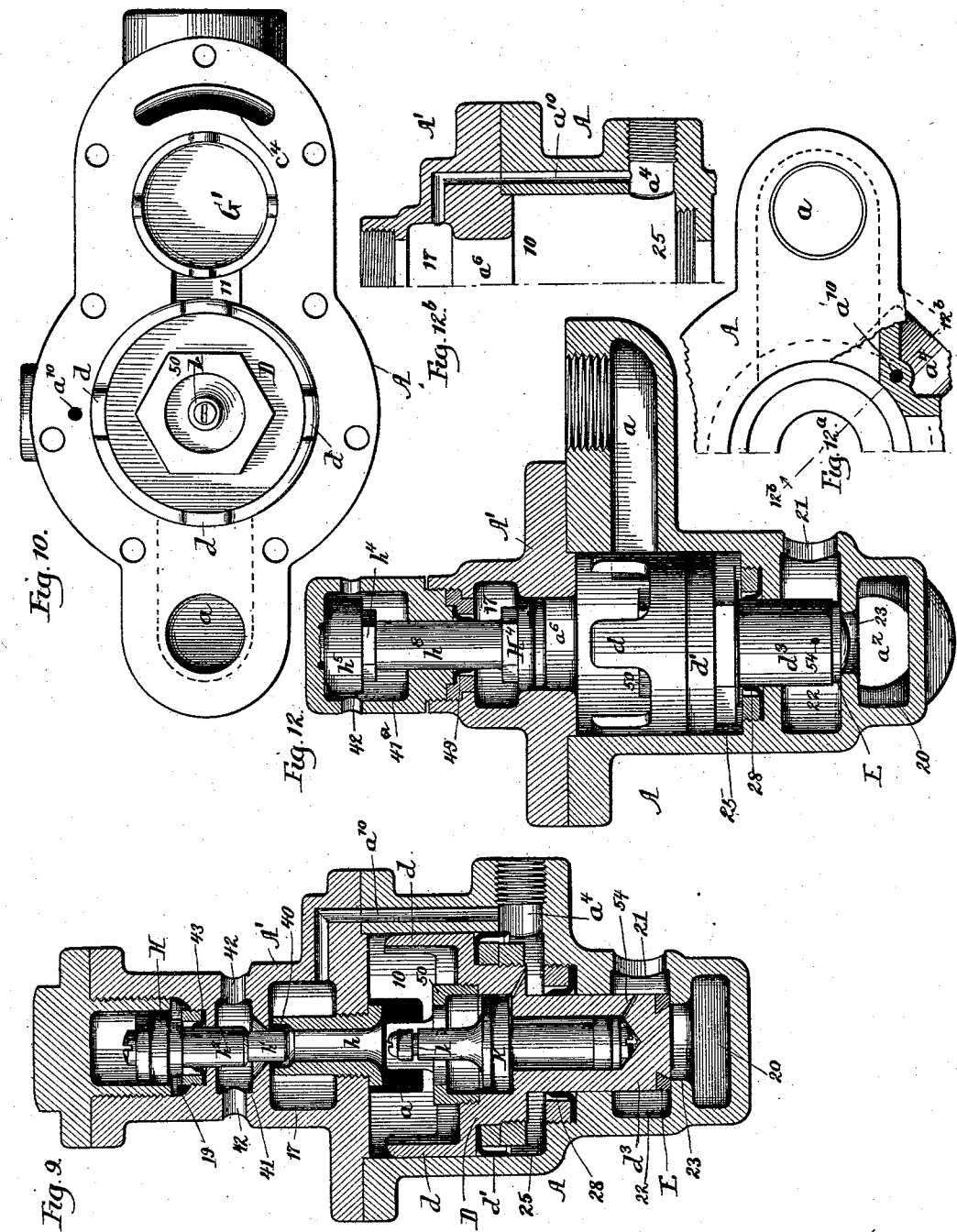
Witnesses:
Fred Gerlach
Percy B. Hills.
Inventor:
B. F. Teal
By Peirce & Fisher
Attorneys.

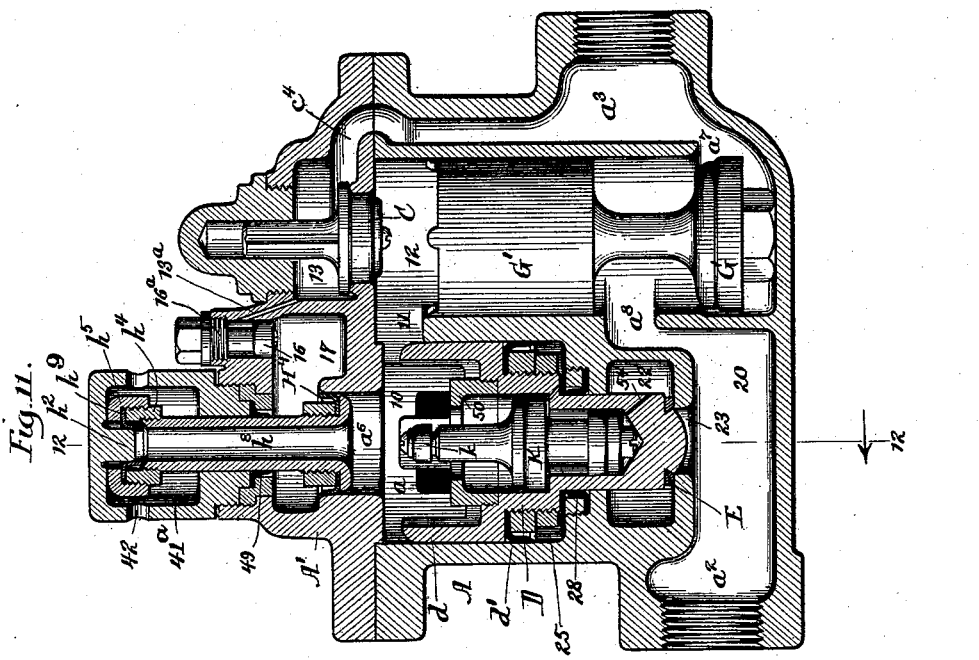

(No Model.) 8 Sheets—Sheet 6.
B. F. TEAL.
FLUID PRESSURE BRAKE MECHANISM FOR RAILWAY CARS.
No. 536,106. Patented Mar. 19, 1895.
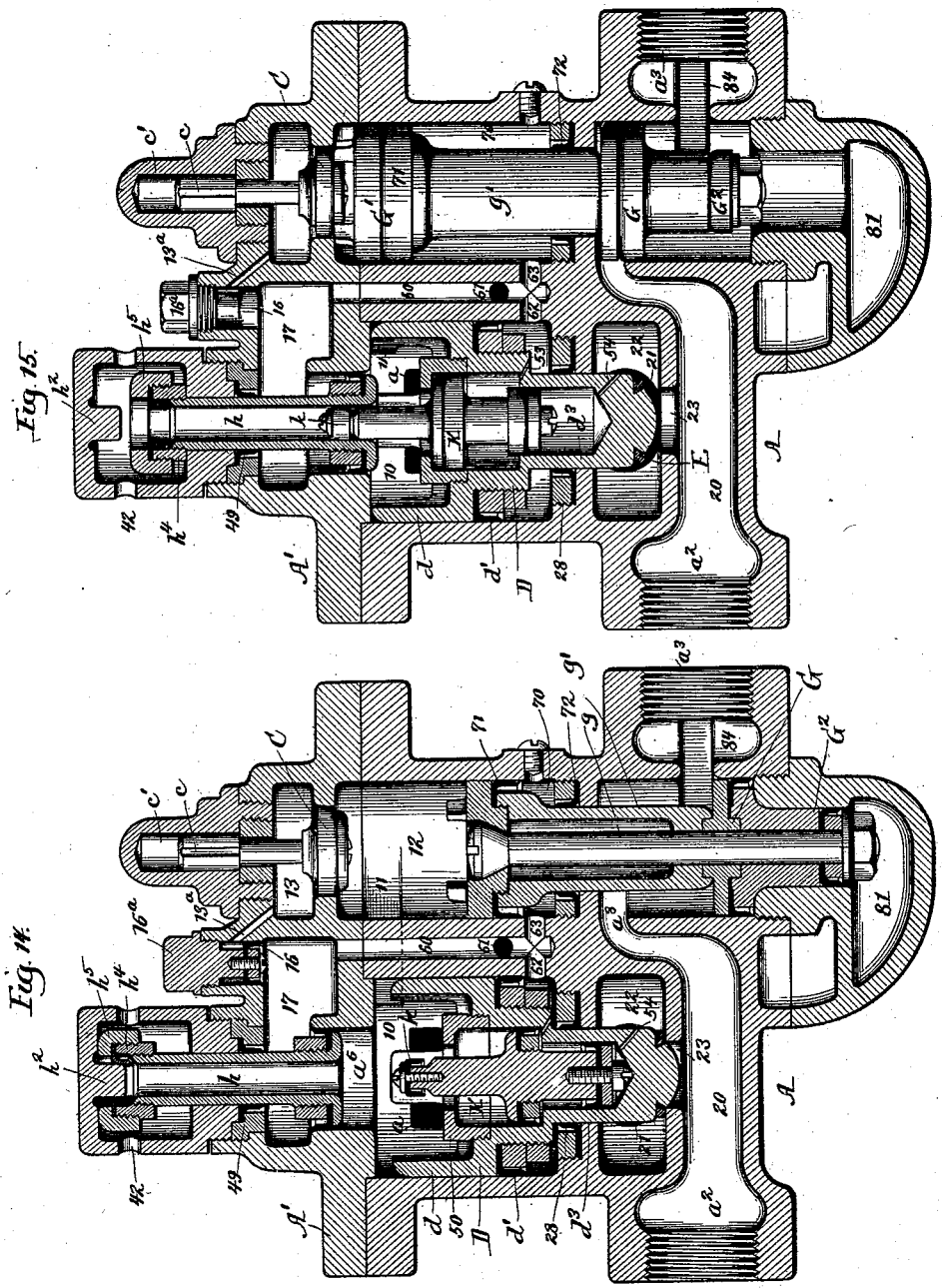
Witnesses:
Fred Gerlach
Frank S. Donahue
Inventor:
B. F. Teal.
By Peirce & Fisher
Attorneys.

(No Model.) 8 Sheets—Sheet 7.
B. F. TEAL.
FLUID PRESSURE BRAKE MECHANISM FOR RAILWAY CARS.
No. 536,106. Patented Mar. 19, 1895.
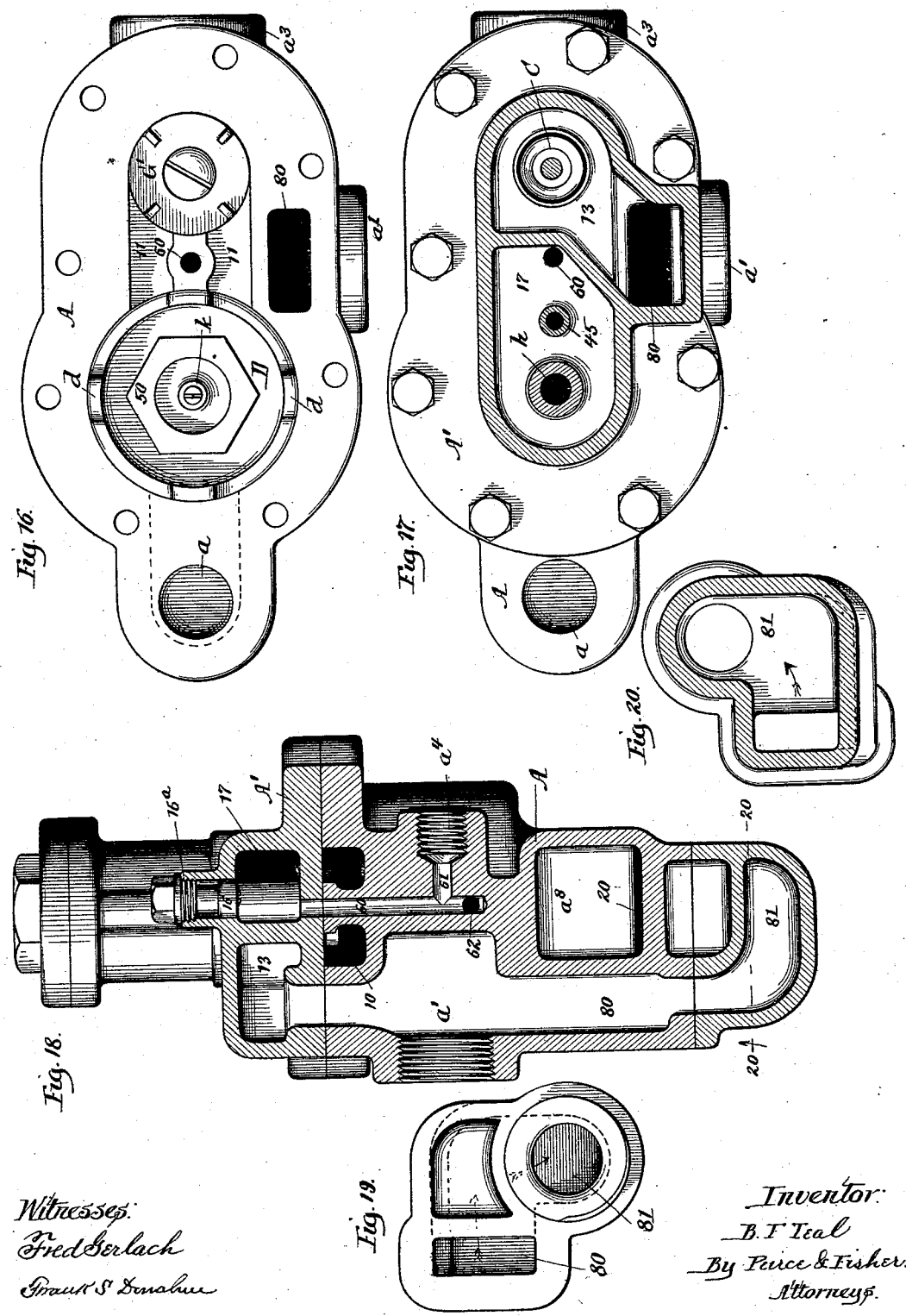

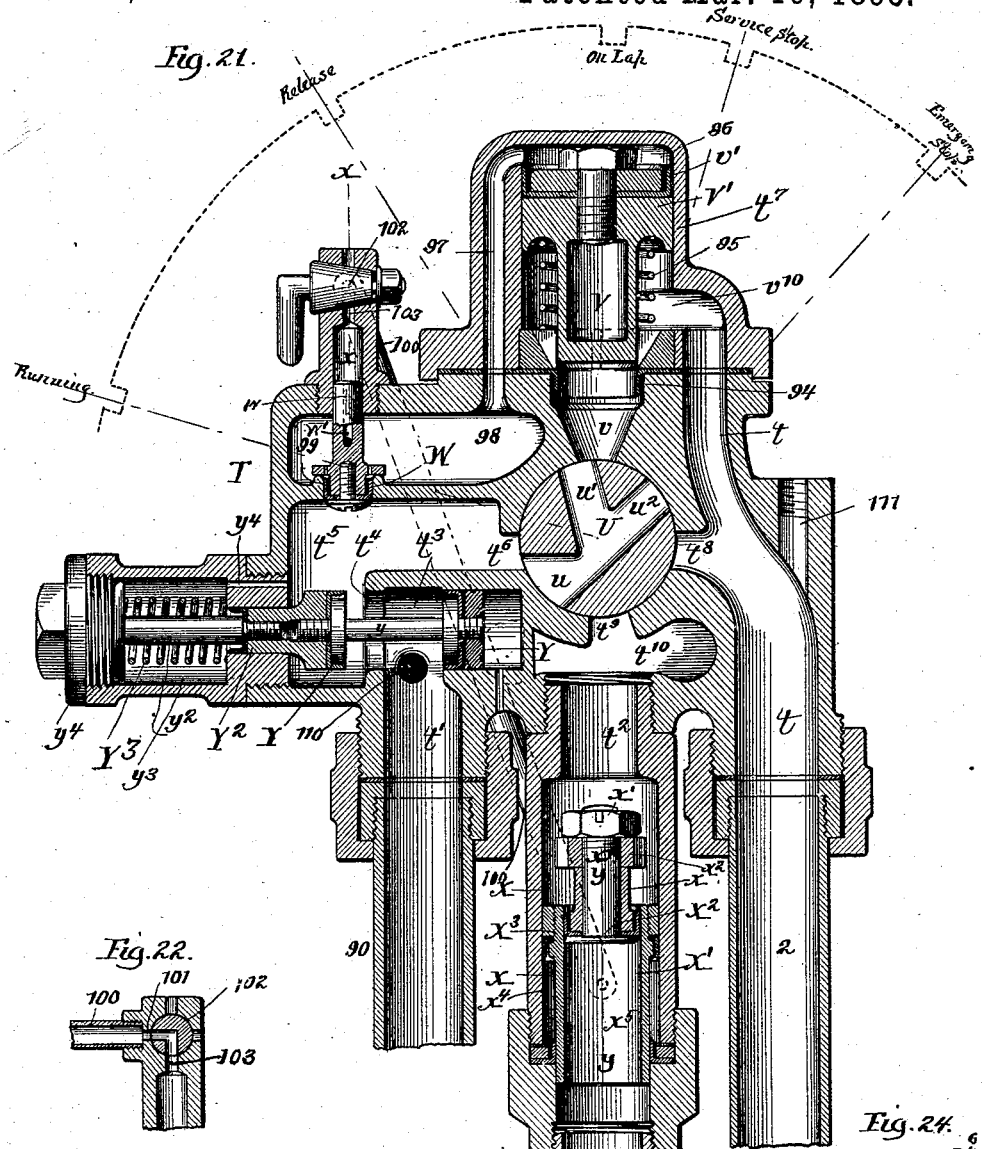

UNITED STATES PATENT OFFICE.

BENJAMIN FRANK. TEAL, OF CHICAGO, ILLINOIS.

FLUID-PRESSURE BRAKE MECHANISM FOR RAILWAY-CARS.

SPECIFICATION forming part of Letters Patent No. 536,106, dated March 19, 1895.

Application filed September 11, 1894. Serial No. 522,719. (No model.)

*To all whom it may concern:*

Be it known that I, BENJAMIN FRANKLIN TEAL, a citizen of the United States, residing at Chicago, in the county of Cook and State of Illinois, have invented certain new and useful Improvements in Fluid-Pressure Brake Mechanism for Railway-Cars, of which I do declare the following to be a full, clear, and exact description, reference being had to the accompanying drawings, forming a part of this specification.

My present invention, while applicable, so far as certain features are concerned, to fluid pressure railway brakes of other kinds, has reference more particularly to that class of railway brake mechanism in which both the application and release of the brakes are effected by the pressure of air admitted to opposite ends of the brake cylinders.

One of the objects of my invention is to provide for more effectively operating the brakes by the admission of stored pressure to both ends of the brake cylinders.

Another object of my invention is to provide improved valve mechanism for controlling the release of air from the brake cylinder.

A further object of invention is to provide improved valve mechanism for effecting the local reduction of train pipe pressure.

Another object of invention is to provide means for automatically stopping the train pipe exhaust when the proper point of train pipe pressure reduction has been reached.

A still further object of invention is to provide a governing valve that will serve to prevent the operation of the emergency or local exhaust controlling valve until the main piston has been operated.

Another object of invention is to provide an improved construction of engineer's valve.

These several objects of invention I have accomplished by the improvements hereinafter described, illustrated in the accompanying drawings, and particularly defined in the claims at the end of this specification.

Figure 1 is a plan view showing the arrangement of brake cylinder, auxiliary reservoir, supplemental reservoir, actuating valve mechanism and train pipe, with their suitable connections beneath the car. Fig. 2 is a view similar to Fig. 1, but showing a modified construction of valve mechanism and modified connections between the brake cylinder and the auxiliary reservoir. Fig. 3 is a view in longitudinal section upon an enlarged scale of the brake cylinder and its piston. Fig. 4 is a plan view of the brake cylinder. Fig. 5 is a view in cross-section through the center of the main cylinder and the piston rod or trunk. Fig. 6 is a view in central vertical longitudinal section through one form of my improved actuating valve mechanism. Fig. 7 is a view similar to Fig. 6, but showing the parts in different position. Fig. 8 is a view in horizontal section on line 8—8 of Fig. 6. Fig. 9 is a view in vertical cross-section on line 9—9 of Fig. 6. Fig. 10 is a plan view of the construction shown in Fig. 6 with the cover of the casing removed. Fig. 11 is a vertical central longitudinal section similar to Fig. 6, but showing a modified form of emergency valve. Fig. 12 is a vertical cross-section on line 12—12 of Fig. 11. Fig. 12$^a$ is a plan view of part of the casing shown in Fig. 12, adjacent to the admission port for train pipe air. Fig. 12$^b$ is a view in vertical section through the casing and cover shown in Fig. 12, this section being taken on line 12$^b$—12$^b$ of Fig. 12$^a$. Fig. 13 is a view similar to Figs. 6 and 7, but showing a modified construction of admission piston and valve. Fig. 14 is a view similar to Fig. 13, but showing the modified form of emergency valve illustrated in Fig. 11. Fig. 15 is a view similar to Fig. 14 with the parts in different position. Fig. 16 is a plan view with the cover removed, of the construction shown in Fig. 13. Fig. 17 is a view in horizontal section on line 17—17 of Fig. 13. Fig. 18 is a view in vertical cross-section on line 18—18 of Fig. 13. Fig. 19 is a detail plan view of the bottom cap. Fig. 20 is a view in cross-section on line 20—20 of Fig. 18 looking up. Fig. 21 is a view in vertical central section through my improved engineer's valve mechanism. Fig. 22 is a detail view in vertical section on line $x$—$x$ of Fig. 21. Fig. 23 is a detail view in vertical section on line $y$—$y$ of Fig. 21. Fig. 24 is a view in central vertical section through a modified form of engineer's valve.

Referring more particularly to Sheets 1 and 2 of the drawings, A designates the casing of my improved actuating valve mechanism.

2 is the train pipe.

3 is the brake cylinder.

4 is the auxiliary reservoir.

5 is the supplemental reservoir and 6 is the pipe leading from the auxiliary reservoir.

In the form of my invention illustrated in Figs. 6 to 12 of the drawings, the actuating valve mechanism comprises a main casing A having a cover A' suitably connected thereto and when this form of my improved valve mechanism is employed, the casing A will be connected by a port $a$ with the train pipe 2, by a port $a^2$ with the end of the brake cylinder 3 opposite the large area of the differential piston B within said cylinder, and will be provided with a port $a^3$ that connects with the auxiliary reservoir and with a port $a^4$ through which air is admitted to the supplemental reservoir 5.

In the preferred form of my invention the brake cylinder 3 has its piston formed as shown more particularly in Fig. 3 of the drawings; that is to say, with a hollow trunk $b$ of sufficient size to so obstruct or protect one side of the piston B against air pressure as to give to the piston the desired differential operation, and one end of the brake cylinder 3 is provided with a port $b'$ that is suitably connected by a pipe with a port $a^2$ of the valve casing while the opposite end of the brake cylinder is provided with the port $b^2$ which, in the arrangement illustrated in Fig. 1 of the drawings, is in constant communication by a branch pipe with the pipe 6 that leads to the auxiliary reservoir 4.

The purpose in reducing the area of the brake cylinder piston B by means of a stem or trunk $b$ is to so reduce the surface of that side of the piston that when an equal fluid pressure per square inch is delivered to the opposite sides of the differential piston it will be caused to move outward by reason of the larger area exposed to pressure upon its inner side or end.

Air from the train pipe 2 is delivered by the port or passage $a$ to the chamber 10 of the casing A and from this chamber it passes by a port 11 into the chamber 12 and lifting the check valve C it passes through the port controlled by this check valve into the chamber 13 and thence by the passage $c^4$ to the port $a^3$ that connects with the auxiliary reservoir pipe 6. Train pipe air will also pass from the chamber 13 around the stationary check valve 16 that is carried by the fixed projection 14, into the chamber 17 (see Fig. 8), and from this chamber it will pass by the port 15 into the chamber 19 formed in the upper part of the cap A' of the main casing. The check valve 16 is shown as a cup leather valve and serves to prevent the back flow of air into the chamber 13. Air is supplied to the supplemental reservoir from the chamber 17 in the cover A' by a channel $a^{10}$ that leads from chamber 17 to the port $a^4$ that connects with the supplemental reservoir. (See Fig. 9.) Within the main casing A is formed a channel 20 by which air delivered to the port $a^2$ from the end of the brake cylinder opposite the large area of the piston is allowed to escape through the exhaust port 21 formed in the side wall of the casing. This channel 20 also serves for the admission of air to the end of the brake cylinder opposite the large area of the piston in a manner to be hereinafter defined. By preference there is formed adjacent the exhaust port 21 a chamber 22, the bottom plate of which is provided with a port 23 that will be normally closed by the valve E at the end of the stem $d^2$ of the main piston D, as seen in Fig. 6 of the drawings. This main piston D has its upper side exposed to train pipe pressure within the chamber 10 of the main casing and the upper side of the piston D is preferably provided with arms $d$ adapted to contact with the cover A' of the main casing in order to limit the upward movement of the piston D. The lower side of the piston D is exposed to pressure of stored air within the chamber 25, this air being admitted by the port $a^4$ from the supplemental reservoir 5 in order to maintain an approximately constant and predetermined pressure within the chamber 25. To the main piston D is fixed a packing ring $d'$ held in place by a suitable nut and follower and serving to form a tight joint about the piston and around the stem $d^3$ of the main piston is fixed a packing ring 28 that serves to prevent the leakage around the piston-stem of air from the chamber 25. From the port $a^3$ that connects with the auxiliary reservoir leads a channel $a^7$ that connects by a point $a^8$ with the channel 20 that leads to the port $a^2$ of the main casing. The port $a^8$ is formed in the main casing at a point above the admission valve G, the movements of which are controlled by the admission piston G', the upper surface of this piston being exposed to train pipe pressure within the chamber 12 of the main casing.

From the construction as thus far defined it will be seen that the end of the main cylinder opposite the smaller area of the differential piston B is at all times in communication with the auxiliary reservoir 4, while communication between the auxiliary reservoir 4 and the opposite end of the brake cylinder is controlled by means of the admission valve G. When this valve G is in the position shown in Fig. 6, air can pass freely from the auxiliary reservoir through the port $a^3$, channel $a^7$, port $a^8$, channel 20, and port $a^2$ to the brake cylinder, but when the valve G is in the closed position seen in Fig. 7, communication with the end of the brake cylinder opposite the large area of the differential piston and the auxiliary reservoir is cut off. When the parts are in the position illustrated in Fig. 6 (termed the release position), air from the auxiliary reservoir will be free to act upon both sides of the differential piston B of the brake cylinder and inasmuch as the outer face of this piston presents a greater surface to pressure of air, the piston B will be forced to a position opposite to that shown in Fig. 3 of the drawings and this movement of the piston will effect the release of the brakes. When it is desired to apply the brakes for service application, the engineer will slightly reduce train pipe pressure and under this slight reduction of pressure the check valve C will close and thus prevent the back flow of air from the auxiliary reservoir, provided the closing of this check valve C has not already taken place, although inasmuch as this check valve has like areas exposed to fluid pressure on opposite sides, the valve will be returned to closed position by gravity as soon as the pressure has equalized within the auxiliary reservoir and train pipe. This exposure of both sides of the check valve C to like pressure is effected by forming the stem of the check valve with a groove $c$ leading to the chamber $c'$ within which the stem of the valve is free to move. When train pipe pressure is thus reduced in chambers 10 and 12 of the main casing, the admission piston $G'$ will be forced upward by reason of the pressure beneath it and its valve G, of air from the auxiliary reservoir and the upward movement of this piston and its valve will cut off communication between the auxiliary reservoir and the end of the brake cylinder opposite the larger area of the differential piston. The reduction of train pipe pressure within the chamber 10 will allow the stored pressure within the chamber 25 acting upon the under surface of the main piston D, plus the pressure of air from the brake cylinder acting upon the end of the piston-stem $d^3$ that is exposed at the port 23, to raise the piston D thereby permitting the escape of air from the brake cylinder through the port $a^2$, channel 20 and ports 23 and 21 to the atmosphere. As soon as sufficient air has been thus exhausted from the brake cylinder to materially lessen in pressure upon the end of the stem $d^3$ of the main piston, the piston will move downward and cause the valve E to close the exhaust, because under the slight reduction of train pipe pressure above mentioned the stored pressure within the chamber 25 at the under side of the main piston is not sufficient of itself to retain the main piston in elevated position. The extent of brake action effected by this initial reduction of train pipe pressure will be proportionate to the difference in effective pressure exerted by reservoir air upon the small area of the differential piston B and the resistance offered by the confined air upon the opposite side of the piston. It is obvious that the engineer in making service stops or in simply slacking the speed of the train can repeat the slight reductions of train pipe pressure until the resistance of air upon the large area of the brake piston is diminished to the desired extent.

Within the cover $A'$ of the main casing is formed a channel $h$ through which train pipe air will be exhausted from the chamber 10 of the main casing when local reductions of train pipe pressure are to be effected in making emergency applications of the brakes. This channel $h$ in the construction shown in Figs. 6, 7 and 13 of the drawings consists of a tube connected by a screw-threaded joint to the cover $A'$ and the mouth of this channel or passage $h$ is adapted to be normally closed by an emergency valve $h'$, the stem $h^2$ of which is connected to the emergency valve piston H. Preferably the mouth of the channel $h$ is provided with a leather packing ring 40 to prevent the escape of air from the channel $h$ to the chamber 41 from which exhaust ports 42 open to the atmosphere. (See Fig. 9.) The stem $h^2$ of the emergency valve $h'$ extends into the chamber 19 and a packing ring 43 is preferably provided around the stem $h^2$ to guard against the leakage of air from the chamber 19. The emergency piston H, preferably constructed as shown in Fig. 7 of the drawings, has its under side exposed to stored pressure within the chamber 19, but the upper surface of this piston is exposed to train pipe pressure that is admitted by a channel 45 from the chamber 10 of the main casing. Stored pressure from the supplemental reservoir 5 is delivered into the chamber 17 by a channel $a^{10}$ that connects this chamber with the port $a^4$ to which the supplemental reservoir is united, and from the chamber 17 stored pressure passes by the channel 15 into the chamber 19 beneath the emergency valve piston H. If desired the channel 45 may be provided with a governing valve 46 having a stem 47 that extends through the seat of the valve and into proximity to the main piston D. This governing valve 46 will lift freely to permit the passage of air from the chamber 10 into the channel 45 but will close automatically to prevent the back flow of air from the channel 45 and will remain closed until the main piston D has been lifted under the reduction of train pipe pressure. Consequently the emergency piston H (when this governing valve 46 is used), is not affected by reason of train pipe pressure until the main piston D has made its initial movement and contacting with the stem 47 has lifted the governing valve 46 from its seat.

The main piston D and its stem $d^3$ are preferably chambered as shown and within these chambers is held the exhaust stop valve piston K carrying the exhaust stop valve $k$ that serves to cut off the exhaust of air from the train pipe when the desired reduction of train pipe pressure has been attained. The piston K is preferably retained in place by a screw-cap 50 that is fixed at the top of the chamber of the main piston D and through the opening in this cap 50 the upper surface of the piston K is exposed to train pipe pressure within the chamber 10 of the casing. The lower side of the piston K is exposed to pressure acting in opposition to train pipe pressure and preferably this pressure consists of stored air admitted to the chamber 52 of the main piston D beneath the piston K through the ports 53 that communicate with the chamber 25 which in turn receives stored pressure by port $a^4$ from the supplemental reservoir 5. The piston K is preferably provided with a packing ring and a packing ring is also provided at the lower end of the piston-stem in order to guard against the leakage of air from the chamber 52. A vent port 54 leads from the bottom of the stem $d^3$ into the chamber 22. The lower end of the channel $h$ will be closed by the exhaust stop valve $k$ in manner to be presently defined, when the local exhaust of air from the train pipe is to be arrested.

From the foregoing description it will be seen that the operation of the form of my invention above set forth is as follows: When the engineer desires to apply the brakes for service stops, or for merely slacking the speed of the train, he will, by means of his engineer's valve effect a slight reduction of pressure within the train pipe 2 and a corresponding reduction of pressure within the chambers 10 and 12 of the main casing A. The effect of this slight reduction of train pipe pressure will be that above set forth, namely, the cutting off of communication between the auxiliary reservoir and the end of the brake cylinder opposite the large area of the piston and the lifting of the main piston D to effect the opening of the exhaust port 21 to permit the escape of air from the end of the brake cylinder opposite the large area of the piston. If however, it is desired to effect an emergency application of the brakes, the engineer will move his engineer's valve to the emergency position so as to effect a sudden and greater reduction of train pipe pressure. Under this greater reduction of pressure within the chamber 10, not only will the main piston D rise, thereby lifting the governing valve 46 from its seat and exposing the upper surface of the emergency piston H to the reduction of train pipe pressure, but under such sudden and greater reduction of train pipe pressure the pressure of stored air within the chamber 19 upon the under side of the emergency piston H will force this piston upward, thereby lifting the emergency valve $h'$ from the mouth of the exhaust channel or passage $h$ and thus permit train pipe air to escape from chamber 10, by the channel $h$ and through the ports 42 to the atmosphere. It will be understood of course that up to this time the exhaust stop valve $k$ and its piston K have retained their normal positions with respect to the main piston D as shown in Fig. 6 of the drawings, because the area of the under side of the piston K exposed to stored air pressure is so much smaller than the area of the upper face of this piston and the valve $k$, which, at such time, are exposed to train pipe pressure. When however, a sufficient reduction of train pipe pressure within the chamber 10 has been effected, the stored air within the chamber 52 acting upon the under side of the piston K will force this piston upward thereby causing the valve $k$ to close the lower end of the channel $h$ and thus arrest further exhaust of train pipe air. The parts will then occupy the relative positions seen in Fig. 7 of the drawings and the brakes will be applied under emergency conditions. If now, it is desired to release the brakes, train pipe pressure will be restored in the chambers 10 and 12 of the main casing. The first effect of this restoration of the train pipe pressure will be to cause the emergency piston H to descend and close the upper end of the channel $h$; after which the exhaust stop piston K will be forced downward by train pipe pressure, thereby partially withdrawing the exhaust stop valve $k$ from the lower end of the channel $h$. The main piston D will then be returned to normal position, the exhaust stop valve $k$ being thereby completely withdrawn from the channel $h$. It will be seen that when the exhaust stop valve $k$ is in its normal position both the piston K and the valve are exposed to train pipe pressure, but when the valve $k$ is within the channel $h$ the total effective area of the piston K exposed to train pipe pressure will be by so much diminished. Consequently in order to restore the piston K to its normal position, train pipe pressure must be raised to a point considerably greater than the point at which the piston K was allowed to close the exhaust on the previous reduction of train pipe pressure. This feature of providing for the closing of the emergency valve before the exhaust stop valve is returned to normal position is an important one because if the emergency valve were in open position at the time that the exhaust stop valve was returned to normal position, then a direct release of train pipe pressure would occur at the very moment when it was desired to restore it, thus rendering it difficult to restore train pipe pressure. When the parts have been returned to the normal or release position shown in Fig. 6, the air passing from the auxiliary reservoir through port $a^3$, channel $a^7$, port $a^8$, channel 20 and port $a^2$ to the end of the brake cylinder opposite the larger area of the differential piston, will cause the release of the brakes in manner above set forth.

It will be understood of course that the several pistons of the actuating valve mechanism (with the exception of the admission piston G), are differential pistons and that the areas of these pistons exposed to train pipe pressure and to stored pressure will be so relatively proportioned as to insure the operation of the several pistons in the manner hereinbefore described. I have not deemed it necessary however, to define any precise areas for these pistons, as these will vary according to the size of the valve mechanism and according to the points of train pipe reduction at which it may be desired to cause the pistons and valves to severally perform their functions.

It will be seen that features of my invention may be varied within wide limits without departing from the spirit of the invention and that parts of the invention may be employed without its adoption as an entirety. Thus, for example, in Figs. 11, 12, 12$^a$, and 12$^b$ of the drawings, I have shown a slightly modified construction of valve casing A and have shown a modified construction of emergency valve mechanism. In this form the valve casing A is provided with a port $a^2$ for connection with the end of the brake cylinder opposite the larger area of the differential piston, and is provided also with a port $a^3$ for connection with the auxiliary reservoir and is provided with an admission piston G′ and valve G identical in construction and function with the valves before described. The same letters of reference are applied to Figs. 11, 12, 12$^a$ and 12$^b$ to indicate corresponding parts that have been hereinbefore described.

The form of valve casing shown in Figs. 11, 12, 12$^a$ and 12$^b$ has the admission port $a$ that connects with the train pipe formed on one side of the casing instead of at its end as in the construction already described. From the chamber 13 above the check valve C, air passes by a channel 13$^a$ around the check valve 16 that consists of a cup leather fixed to the lower end of the stem of the screw plug 16$^a$, and the air thus leaking around the valve 16 enters the chamber 17 and exerts pressure upon the upper side of the emergency valve piston H$^4$ that is movably sustained within the cylindrical opening $a^6$ of the cover A′ so that the under surface of this piston H$^4$ is exposed to train pipe-pressure within the chamber 10 of the main casing. In this form of my invention the emergency valve piston H$^4$ is perforated and carries the tubular stem $h^8$, the end of which constitutes an emergency valve $h^9$ that sets over a projecting valve-seat $h^2$. The emergency valve $h^9$ comprises a leather packing ring that is attached to the end of the hollow stem $h^8$ by means of the rings $h^4$ and $h^5$. (See Fig. 11.) The emergency valve $h^9$ moves within a chamber 41$^a$ provided with exhaust ports 42, this chamber being preferably formed within a cap that is attached to the cover A′ of the casing by a threaded joint as shown. Preferably also a packing ring 49 encircles the stem $h$ of the emergency piston H$^4$ so as to guard against leakage of air from the chamber 17.

By reference more particularly to Figs. 12 and 12$^b$, it will be seen that the chamber 17 is supplied with supplementary reservoir air passing to this chamber by the channel $a^{10}$ and by the port $a^4$ that connects with the supplemental reservoir. The construction of main piston D and of the exhaust stop valve $k$ and its piston K is the same as that illustrated in Figs. 6 and 7 and need not therefore be again described, and in like manner also air is delivered to the under side of the main piston from the supplemental reservoir 5 by a port leading to the chamber 25.

From the foregoing description it will be obvious that the operation of the valve mechanism described in Figs. 11 and 12 will be substantially the same as the operation of the mechanism illustrated in Figs. 6 and 7, the only material point of difference being that in the form illustrated in Fig. 11 the channel $h^8$ to which the local exhaust of train pipe pressure is effected is carried by the emergency valve piston and the emergency valve has an annular valve that fits over a fixed seat. When sufficient reduction of train pipe pressure has been effected by the engineer to cause the stored pressure within the chamber 17 to depress the piston H, the emergency valve $h^9$ will leave its plug-seat $h^2$ and thus permit train pipe air to escape from the chamber 10 of the main casing; and reversely, when train pipe pressure has been restored to a point at which it serves to overcome the stored pressure within the chamber 17, the piston H$^4$ will rise causing the emergency valve $h^9$ to close over this seat-plug $h^2$. It will be understood however, that in this form of my invention as in that hereinbefore described, the areas of the several pistons will be so proportioned that the emergency valve piston H$^4$ will cause the emergency valve to close before the exhaust stop valve $k$ has been withdrawn from the lower end of the exhaust channel $h^8$. I have omitted from the construction shown in Figs. 11 and 12 the governing valve 46 illustrated in Figs. 6 and 7, as this governing valve is not essential to the working of my invention in either of its forms.

In Fig. 13 of the drawings I have shown how the construction of the main piston and emergency valve mechanism and exhaust stop valve mechanism illustrated in Figs. 6 and 7 may be applied in connection with a type of admission piston and valve different from that shown in Figs. 6 and 7, and in Figs. 16 to 20 of the drawings I have shown more particularly the modifications of the main casing that are made when this type of admission piston and valve are employed and when the actuating valve mechanism is connected with the brake cylinder, the auxiliary reservoir and the train pipe in the manner illustrated in Fig. 2 of the drawings. The valve mechanism within the left-hand side of the main casing shown in Fig. 13 is the same (with the omission of the governing valve 46), as the mechanism illustrated in Figs. 6 and 7 of the drawings, with the exception of slight differences in arrangement of the ports for delivering air from the supplemental reservoir 5 as will be hereinafter more particularly pointed out. So also the construction of valve mechanism at the left hand side of the casing in Figs. 14 and 15 of the drawings, is the same as that illustrated in Fig. 11 of the drawings and the parts being correspondingly lettered, need not be again described in detail. It will be noticed however, that in those forms of my invention in which a tubular emergency valve piston is employed as in Figs. 11, 14 and 15, the admission port $a$ that leads to the chamber 10 of the main casing is shown as entering the casing from one side (see Fig. 12) instead of from the end as in Figs. 6, 7 and 13. I will now proceed to describe the construction and mode of operation of the admission valve G and its piston G′ and the modifications of the casing and connections employed with said type of valve and piston. I do not wish to be understood however, as claiming in this application the specific construction of the admission valve and casing next to be described nor the arrangement by which the stored air is caused to be exhausted from one side of the brake cylinder to the opposite side of the cylinder for the purpose of releasing the brakes, as this forms subject-matter of a separate application filed by me of even date herewith, Serial No. 522,720.

In the following description it will be seen that the construction shown in Fig. 13 is the one illustrated fully in Figs. 16 to 20 of the drawings, although the valve casing employed with this construction differs but very slightly from that employed with the construction of valve mechanism illustrated in Figs. 14 and 15. Referring therefore to Fig. 13 and to Figs. 16 to 20 of the drawings, it will be seen that air from the chamber 13 at the upper right-hand side of the main casing A passes by the channel $13^a$, around the check valve 16 into the chamber 17 and thence passes by the channel 60 and by channel 61 to a pipe leading to the supplemental reservoir 5 and by this means the supplemental reservoir is supplied with compressed air from the auxiliary reservoir. Air from the supplemental reservoir passes through the lower part of the channel 60 and by the branch channel 62 into the chamber 25 beneath the main piston D and by the branch channel 63 into a chamber 70 formed beneath the under side of the admission piston G′. This admission piston G′ has its upper surface therefore exposed to train pipe pressure within the chamber 12 of the main casing while its under side is exposed to stored pressure within the chamber 70 working in opposition to said train pipe pressure. Suitable packing rings 71 and 72 will be employed to guard against the leakage of air from the chamber 70, these packing rings being held in position as shown more particularly in Fig. 14 of the drawings. By preference the admission piston G′ is provided with a stem $g$ encircled by a sleeve $g'$ and at the lower end of this stem is carried an admission valve G which serves to cut off the admission of stored air from the end of the brake cylinder opposite the small area of its differential piston to the channel 20 that connects with the end of the brake cylinder opposite the large area of said piston.

By referring to Fig. 2 of the drawings it will be seen that with the form of casing illustrated in Figs. 13 to 20 of the drawings the auxiliary reservoir 4 connects by a pipe 6 with a port $a'$ at the back of the valve casing (see Figs. 16 and 18) and into this port $a'$ air is delivered by the channel 80 (see Figs. 17 and 18) from the chamber 13 above the check valve C. From the port $a'$ auxiliary reservoir air passes downward through the lower part of the channel 80 and then around in the direction of the arrow, Fig. 19, into the space 81 beneath the delivery valve $G^2$ (see Fig. 14) whereby the delivery of air from the auxiliary reservoir to the brake cylinder is controlled. The air passing upward from the space 81 beneath the valve $G^2$ and through the port 83 (see Fig. 13) that is closed by said valve passes through the port 84 and thence passes by the port $a^3$ to the end of the brake cylinder opposite the small area of the differential piston, it being understood of course that air thus passes to said end of the cylinder only when it is desired to effect the application of the brakes. When the parts are in the position illustrated in Figs. 13 and 14 of the drawings, which is the normal or "release" position, there is a free communication between the end of the brake cylinder opposite the small area of the piston and the opposite end of this cylinder by way of the ports $a^3$, 84, $a^3$, channel 20 and port $a^2$, and by reason of the greater area exposed to pressure by the outer end of the differential piston, the piston will be held in a position opposite that shown in Fig. 3 of the drawings to retain the brakes from off the wheels. If now it is desired to apply the brakes for the purpose of making service stops or for merely slacking the speed of the train the engineer, by means of the engineer's valve, will make a slight reduction of train pipe pressure in manner hereinbefore described. Under this reduction of train pipe pressure the admission piston G′ will rise, lifting the admission valve G until it passes the port 84 and thus cuts off communication between the opposite ends of the brake cylinder. The main piston D will also rise under the reduction of train pipe pressure within the chamber 10 thereby lifting the valve E from its seat and permitting an exhaust of air from the end of the brake cylinder opposite the larger area of the differential piston through port $a^2$, channel 20, chamber 22 and port 21 to the atmosphere. As the admission piston G′ continues to rise, the delivery valve $G^2$ will pass from out the port 83 thereby permitting auxiliary reservoir air to pass from channel 80 (see Figs. 18 and 19) by space 81 and ports 83, 84 and $a^3$ to the end of the brake cylinder opposite the small area of the piston. (See Fig. 2.) The pressure of auxiliary reservoir air thus delivered to the small area of the differential piston, within the brake cylinder while the opposite end of the brake cylinder is in communication with the atmosphere as above defined, will cause the differential piston to move to the position shown in Fig. 3 of the drawings, thereby effecting the application of the brakes. When the emergency application of the brakes is desired, a greater reduction of train pipe pressure will be made by the engineer's valve, and the exhaust stop valve, in both the constructions shown by Figs. 13 and 14 will be brought into operation in the manner hereinbefore explained. So also it is obvious that when it is desired to release the brakes, train pipe pressure will be restored and the main piston D, the emergency valve H and the exhaust stop valve will be returned to normal position as hereinbefore described and on such increase of train pipe pressure the admission piston G' will be caused to descend to the position seen in Fig. 13 of the drawings, thereby first closing communication between the auxiliary reservoir and the brake cylinder and again opening communication through the valve casing between the opposite ends of the brake cylinder. As soon as communication is thus established between the opposite ends of the brake cylinder, confined air passing from the end of the brake cylinder opposite the smaller area of the differential piston will enter the brake cylinder opposite the larger area of the piston and by reason of the difference in areas thus exposed to like pressure the differential piston will be moved to a position the reverse of that shown in Fig. 3 of the drawings and will thus effect the release of the brakes.

The engineer's valve illustrated in Figs. 21, 22 and 23 of the drawings comprises a casing T that is suitably connected by a channel $t$ to the train pipe 2 and by a channel $t'$ to a pipe 90 that leads to the usual main reservoir on the locomotive or tender. The casing T is also provided with a port or channel $t^2$ that communicates with an exhaust pipe 91 opening to the atmosphere. The channel $t'$ admits air from the main reservoir to the cylinder $t^3$ and from this cylinder main reservoir air will pass by an opening $t^4$ into the chamber $t^5$. This chamber $t^5$ communicates by a port $t^6$ with the chamber wherein is held the plug-cock U that is operated by the usual handle or lever within reach of the engineer as well understood. The plug-cock U is a three-way cock, being provided with ports $u$, $u'$ and $u^2$. When this cock U is in the position seen in Fig. 21 of the drawings, main reservoir air will pass from the chamber $t^5$ by port $t^6$ and by the port $u$ and $u'$ of the cock U into a channel $v$ formed within the casing T and adapted to be closed by a cut-off valve V which, when in closed position, fits within the packing ring 94 that constitutes a seat for the valve. The valve V is carried by a piston V' preferably furnished at its top with a packing ring $v'$, this piston being movably held within a cylinder $t^7$ at the top of the casing T. A coil spring 95 bears upon the under face of the piston V' and serves to hold this piston in raised position when the pressure of air upon its opposite sides is equalized. Air from the main reservoir will be admitted to the chamber 96 above the piston V' by a channel 97 that communicates with the chamber 98 to which main reservoir air is admitted from the chamber $t^5$ by a port 99, this port being normally closed by a check valve W that is furnished with a cup leather to insure its tightly closing the port. The chamber wherein the plug-cock U is held communicates by a port $t^8$ with the channel $t$ that leads to the train pipe 2 and communicates by a port $t^9$ with a chamber $t^{10}$ that connects with the exhaust port $t^2$.

From the description as thus far given it will be seen that when the parts are in the position shown in Fig. 21 of the drawings, air from the main reservoir will pass by the port $t'$, cylinder $t^3$, opening $t^4$, chamber $t^5$, port $t^6$, ports $u$ and $u'$ of the plug U, channel $v$, and chamber $v^{10}$ to the channel $t$ that leads to the train pipe 2, and pressure of main reservoir air will thus be maintained within the train pipe; and this position of the engineer's valve is what is commonly termed the "running" position. It will be seen also that with the parts in this position, main reservoir air will pass from the chamber $t^5$ into the chamber 98 and thence by channel 97 to the chamber 96 above the cut-off piston V'. Inasmuch as both sides of the piston V' are thus exposed to equal air pressure, the coil spring 95 will maintain the piston V' and the valve V at such time in raised position, thus allowing the air to continue to pass from the main reservoir to the train pipe. If from any cause however, a break or leakage in the train pipe or its couplings, or a use of the conductor's valve should occur while the plug-valve U is in the "running" position shown, the sudden decrease of pressure within the train pipe will effect a corresponding reduction of pressure beneath the piston V' thereby allowing the excess air pressure upon the upper side of this piston to force the piston downward so as to cause the valve V to close the channel $v$ and thus prevent further admission of air from the main reservoir into the train pipe. Loss of air from the main reservoir will thus be automatically prevented in case of any escape of air from the train pipe other than that caused by the proper setting of the engineer's valve.

When the engineer desires to effect a reduction of pressure within the train pipe for the purpose of making service stops or for merely reducing the speed of the train, he will turn the lever of the plug-valve U to the position indicated by the dotted lines opposite which the words "Service stop" are written, thereby bringing the port $u'$ partially coincident with the port $t^8$, and the port $u^3$ partially opposite the port $t^9$ thus allowing a gradual escape of air from the train pipe through the channel $t$, the above mentioned ports and the port or channel $t^2$, at the same time cutting off the main reservoir by closing port $t^6$. From the port $t^2$ the air will escape to the atmosphere through a cylinder X wherein is movably mounted an annular valve X′ that closes over a fixed seat or plug $X^2$ comprising preferably a cup leather held upon the lower end of a sleeve $x$ by means of a threaded bolt or stem $x'$ that passes through a fixed bracket or spider $x^2$ within the casing X. The annular valve X′ has its outer periphery provided with a piston $X^3$, the upper end of which is exposed to pressure of air escaping from the train pipe while its lower side is exposed to air within the annular chamber or space $x^4$ between the casing X and the tubular stem $x^5$ and the exhaust stop valve X′. Preferably a cup leather packing ring is provided as shown at the under side of the piston $X^3$ and a similar packing ring encircles the stem $x^5$ of the exhaust stop valve at the base of the chamber $x^4$. From the chamber $x^4$ a pipe 100 leads to a port 101 that communicates with the casing of the plug-valve 102 (see Fig. 22), from the casing of which valve a channel 103 leads to the space above the stem $w$ of the check valve W. The stem $w$ of this check valve is provided with a channel $w'$ that connects the chamber 98 with the space above the stem $w$ and consequently when the valve 102 is in the position shown in Fig. 22, main reservoir air from the chamber 98 will pass through the pipe 100 to the chamber $x^4$ beneath the piston $X^3$ of the exhaust stop valve X′. The piston $X^3$ of the exhaust stop valve is a differential piston as the upper end of this piston exposes a larger area to air pressure than does that part of the piston exposed within the chamber $x^4$. Hence while the pressure of stored air within the chamber $x^4$ tends to hold the piston $X^3$ and the valve X′ in the position shown, it is obvious that when the engineer's valve has been turned so as to admit train pipe pressure to the upper face of the piston, the latter will be forced downward and away from the fixed seat or plug $X^2$ thus allowing the air to escape from the train pipe until the pressure of such air is so far reduced that it is insufficient to retain the piston $X^3$ in depressed position and will consequently allow the stored air within the chamber $x^4$ to raise the valve X′ thereby causing it to stop the further exhaust of air from the train pipe. Hence it will be seen that when air is allowed to escape from the train pipe by turning the cock of the engineer's valve in manner above indicated this escape of air from the train pipe will continue until the desired degree of reduction is attained, when the valve X′ will be lifted by the stored air within the chamber $x^4$ and will arrest further exhaust of train pipe air, the limit of such reduction being determined by the reduction necessary to give the full emergency application of the brake mechanism. It may be sometimes desirable to reduce the pressure within the chamber 98, or within the chamber $x^4$ beneath the exhaust stop piston $X^3$. By means of the valve 102 an escape of air can be had from either of these chambers, as will be obvious by reference to Fig. 22 of the drawings; or if for any reason it is desired to throw the exhaust stop valve out of service, the valve 102 can be turned so as to blank the ports 100 and 103 and thus cut off the passage of air between the chamber 98 and the chamber $x^4$ beneath the exhaust stop piston. The valve casing will be provided with suitable ports 110 and 111 to which will be connected the usual dual pressure gage for indicating to the engineer the pressures within the main reservoir and train pipe respectively.

In order to permit a considerably greater pressure to be maintained in the main reservoir than is used in the train pipe I prefer to employ the construction of pressure reducing valve next to be described. This valve comprises two pistons Y and Y′ carried by the stem $y$ and working within the cylinder $t^3$ of the main casing. The periphery of each of these pistons is preferably provided with cup leathers in order to secure a tight joint. The piston Y serves as a valve to regulate the passage of air from the main reservoir through the opening $t^4$. To the piston valve Y is connected a supplemental piston $Y^2$, the stem $y^2$ of which extends within a chamber $y^3$ suitably attached to the main casing, the outer end of this chamber being preferably closed by a threaded cap $y^4$. The stem $y^2$ of the supplemental valve $Y^2$ is encircled by a coil spring $Y^3$, one end of which bears against the end of the chamber $y^3$ while its opposite end bears against the head of the stem $y^2$. The chamber $y^3$ connects with the chamber $t^5$ by means of the channel $y^4$ so that the chamber $y^3$ has therein at all times the same degree of air pressure as the chamber $t^5$. The areas of the pistons Y and Y′ being the same, the pressure of main reservoir air within the cylinder $t^3$ will have no effect upon these pistons, they being in equilibrium. The supplemental piston $Y^2$ however, is exposed to the air pressure within the chamber $y^3$ and the area of this supplemental piston is such that it will exert a tendency to force the piston valve Y to close the port $t^4$. The coil spring $Y^3$ acts in opposition to the supplemental piston $Y^2$ and the force of this spring is so adjusted as to equal the opposing force of the supplemental piston $Y^2$ under the degree of pressure desired to be normally carried in the train pipe. It will therefore be seen that when the pressure within the chamber $t^5$ exceeds the desired normal pressure a corresponding excess of pressure will be exerted in the chamber $y^3$ and upon the supplemental piston $Y^2$ thereby overcoming the resistance of the spring $Y^3$ and causing the valve piston Y to partially or entirely close the port $t^4$ that leads to the main reservoir pipe. On the other hand, as soon as the pressure falls within the chamber $t^5$ the spring $Y^3$ will again move the valve piston Y outward so as to open the port $t^4$ to permit the free passage of air from the main reservoir pipe. It will thus be seen that any desired pressure can be maintained in the train pipe regardless of any higher pressure within the main reservoir; and it will be seen also that by carrying a very high pressure within the main reservoir the capacity of this reservoir is proportionately increased without a corresponding increase in size.

In view of the well recognized mechanical equivalency of flexible diaphragms for pistons in mechanism of this character, I desire that the term "piston" as used throughout the description and claims shall be regarded as synonymous with the more generic term "movable abutment," commonly employed in describing mechanism of this character, since it is manifest that flexible diaphragms may be used without departing from the spirit of the invention. Thus for example in Fig. 24 of the drawings I have shown a modified construction of engineer's valve in which a flexible diaphragm is employed to perform the function of the valve operating piston $V'$ shown in Fig. 21 of the drawings. Referring to this modified construction, $t'$ designates the pipe leading from the main reservoir and 2 denotes the train pipe that communicates by the channel $t$ with the main casing T of the valve. Within the upper part of the main casing T is placed the diaphragm $V^6$ to which is connected a valve $V^7$ that closes a port or channel $v^4$ of the casing. In this modified form of the invention the stem of the valve $V^7$ is tubular and by means of this stem air can pass from the chamber above the valve seat $v^4$ through the ports $v^2$ and $v^3$ to the chamber beneath the flexible diaphragm $V^6$ and thence into the channel $t$ that leads to the train pipe 2. From the main reservoir pipe 90 a passage 97 leads to the chamber 96 of the casing above the diaphragm $V^6$ and within the lower part of the casing is placed a threeway plug-cock U corresponding to the cock shown in Fig. 21 of the drawings and operated by the usual engineer's hand lever 115. The chamber wherein the plug-cock U is contained communicates with the main reservoir pipe 90 by a passage $t^{61}$ and by a passage $t^{80}$ communication is had between this chamber and the channel $t$ that leads to the train pipe. An exhaust port or passage $t^9$ leads from the plug-cock casing to the atmosphere. It will thus be seen that when the parts are in the "running" position as shown in Fig. 24 main reservoir air will pass from the main reservoir pipe 90 through the plug-cock and through the tubular stem of the valve $V^7$ to the space beneath the diaphragm $V^6$ and thence to the train pipe. At the same time main reservoir air will pass by the channel 97 to the space 96 above the diaphragm $V^6$ and thus counterbalance the pressures upon opposite sides of the diaphragm. If however, from any cause pressure is reduced in the train pipe while the parts are in the normal or "running" position shown, a corresponding reduction of pressure upon the under side of the diaphragm will allow the excess pressure upon the upper side of the diaphragm to force this diaphragm and the valve $V^7$ downward thereby causing the valve to close against its seat and cut off further communication between the main reservoir and the train pipe. In the passage 97 that leads from the main reservoir pipe to the space 96 above the diaphragm $V^6$ is interposed a check valve $W^4$ that will serve to prevent the back flow of air from the chamber above the diaphragm when any reduction of pressure occurs in the main reservoir, thus maintaining a constant pressure within the chamber 96 above the diaphragm to insure the prompt closure of the valve $V^7$. In this last form of the invention I have not deemed it necessary to illustrate either the exhaust stop valve or the pressure reducing valve.

Certain features of the valve mechanism herein shown and described but not claimed form the subject-matter of a separate application, Serial No. 522,720, filed by me September 11, 1894, and I do not wish to be understood as claiming herein such features as are here shown and described but specifically claimed in said companion application.

What I claim as new, and desire to secure by Letters Patent, is—

1. In an automatic fluid pressure brake system, the combination of a brake cylinder, an auxiliary reservoir connected with and supplying the air used in both ends of said cylinder, whereby both the application and release of the brakes are effected by stored pressure, a train pipe, and an actuating valve mechanism, said actuating valve mechanism being provided with an exhaust port, whereby air is allowed to escape from said brake cylinder and being provided also with independent admission and escape valves and pistons for controlling the admission and escape of air to and from said brake cylinder and with an independent passage uncontrolled by said pistons whereby air is supplied from the train pipe to the auxiliary reservoir, substantially as described.

2. In an automatic fluid pressure brake system the combination of a brake cylinder, an auxiliary reservoir connected with and supplying the air used in both ends of said cylinder, whereby both the application and release of the brakes are effected by stored pressure, a train pipe, and an actuating valve mechanism suitably connected with said train pipe, said reservoir and said brake cylinder; said actuating valve mechanism being provided with an exhaust port by which air is allowed to escape from the release end of said brake cylinder and being provided also with suitable valvular appliances for effecting the simultaneous exposure of both sides of the piston within the brake cylinder to stored pressure when the brakes are to be released and with an independent passage uncontrolled by said pistons whereby air is supplied from the train pipe to the auxiliary reservoir, substantially as described.

3. In an automatic fluid pressure brake system the combination with a brake cylinder having a differential piston therein, an auxiliary reservoir supplying the air used in both ends of said cylinder whereby both the application and release of the brakes are effected by stored pressure, a train pipe, and an actuating valve mechanism suitably connected with the train pipe, with the brake cylinder and with the auxiliary reservoir, said actuating valve mechanism being provided with an exhaust port by which air is released from the end of the brake cylinder opposite the larger area of its piston, a valve for controlling said exhaust port, a piston exposed to train pipe pressure for operating said valve, an independent valve for controlling the admission of stored pressure to said end of the brake cylinder opposite the larger area of the differential piston an independent piston exposed to train pipe pressure for operating said controlling valve and an independent valve-controlled passage connecting the train pipe and the auxiliary reservoir, substantially as described.

4. In an automatic fluid pressure brake system, the combination with a brake cylinder having a differential piston therein, an auxiliary reservoir supplying the air used in both ends of said cylinder, whereby both the application and release of the brakes are effected by stored pressure, a train pipe and an actuating valve mechanism suitably connected with said train pipe, said reservoir and said brake cylinder; said actuating valve mechanism being provided with an exhaust port by which air is released from the end of the brake cylinder opposite the larger area of the piston, a valve for controlling said exhaust port, a piston for operating said valve exposed on one side to train pipe pressure and upon its opposite side to a substantially constant pressure of stored air within a chamber independent of reductions of pressure in the train pipe and auxiliary reservoir, an independent valve for controlling the admission of stored fluid pressure to the end of the brake cylinder opposite the larger area of the piston and an independent piston for operating said independent valve exposed on one side to train pipe pressure and upon its opposite side to a pressure in opposition to said train pipe pressure, substantially as described.

5. In an automatic fluid pressure brake system, the combination with a brake cylinder having a differential piston therein, an auxiliary reservoir supplying the air used in both ends of said brake cylinder whereby both the application and release of the brakes are effected by a stored pressure, a train pipe, and an actuating valve mechanism suitably connected with said train pipe, said reservoir and said brake cylinder; said actuating valve mechanism being provided with an exhaust port by which air is released from the end of the brake cylinder opposite the larger area of the piston, a valve for controlling said exhaust port, a differential piston for operating said valve exposed on one side to train pipe pressure and upon its opposite side to a substantially constant stored air pressure within a chamber closed against back flow of air therefrom to both the train pipe and the auxiliary reservoir and acting in opposition to said train pipe pressure, an independent valve for controlling the admission of stored pressure to the end of the brake cylinder opposite the larger area of the piston and an independent piston for operating said independent valve exposed on one side to train pipe pressure and upon its opposite side to a pressure in opposition to said train pipe pressure, substantially as described.

6. In an automatic fluid pressure brake system, the combination of a train pipe, a brake cylinder having a differential piston therein, an auxiliary reservoir in constant communication with the end of said cylinder opposite the small area of its piston and connected by a valved passage with the opposite end of said brake cylinder, an exhaust port for the escape of air from the end of said brake cylinder opposite the large area of its piston and suitable valve mechanism exposed to train pipe pressure for controlling the admission and exhaust of air to and from said end of the brake cylinder opposite the large area of its piston and provided with an independent valve controlled passage connecting the train pipe and auxiliary reservoir, substantially as described.

7. In an automatic fluid pressure brake system, the combination of a train pipe, a brake cylinder having a differential piston therein, an auxiliary reservoir in constant communication with the end of said cylinder opposite the small area of its piston and connected by a valved passage with the opposite end of said brake cylinder, and an actuating valve mechanism having an exhaust port for the escape of air from the end of said brake cylinder opposite the large area of its piston, a valve for controlling said exhaust port, a piston for actuating said valve exposed to train pipe pressure on one side and upon its opposite side to a substantially constant pressure of stored air within a chamber at all times independent of reductions of pressure in both the train pipe and auxiliary reservoir, an independent valve for controlling the admission of air to the end of said brake cylinder opposite the large area of its piston, and a piston exposed to train pipe pressure for actuating said independent valve, substantially as described.

8. In an automatic fluid pressure brake system, the combination of a train pipe, a brake cylinder having a differential piston therein, an auxiliary reservoir in constant communication with the end of said cylinder opposite the small area of its piston and connected by a valved passage with the opposite end of said brake cylinder, and an actuating valve mechanism comprising a casing having an exhaust port therein for the escape of air from the end of the brake cylinder opposite the large area of its piston, a valve within said casing for controlling said exhaust port, a piston for operating said valve, an independent valve within said casing for controlling the admission of air to the end of said brake cylinder opposite the large area of its piston, an independent piston for operating said independent valve, and suitable chambers within said casing for exposing said valve-operating pistons on one side to train pipe pressure and upon their opposite side to a pressure in opposition to said train pipe pressure and with a valve controlled passage independent of said piston whereby the admission of air from the train pipe to the reservoir is effected, substantially as described.

9. In an automatic fluid pressure brake system, the combination with a brake cylinder, a train pipe, and an auxiliary reservoir, of an actuating valve mechanism comprising a casing having an exhaust port for venting air from the brake cylinder and a main piston for controlling said brake cylinder exhaust, said main piston being exposed on one side only to train pipe pressure and on its opposite side to pressure within a chamber permanently separated from said train pipe pressure by said piston, and closed against access thereto of air from the brake cylinder and a valve fixed at the end of said piston stem and exposed to the air pressure of that end of the brake cylinder to which said exhaust port is connected, whereby the reduction of pressure within said end of the brake cylinder to the required degree will permit said valve to close and arrest the exhaust from said cylinder, substantially as described.

10. In an automatic fluid pressure brake system, the combination with a brake cylinder, a train pipe, an auxiliary reservoir and suitable connections, of a casing provided with an exhaust port or passage, a valve and main piston for controlling said exhaust port or passage, a chamber within said casing connected with the train pipe and wherein one side of said main piston is exposed to train pipe pressure, a passage leading from said chamber to locally exhaust the train pipe, an emergency valve normally closing said local exhaust passage, and an independent piston exposed in said chamber to train pipe pressure on one side only for controlling said local exhaust passage, said piston being exposed upon its opposite side to stored pressure within a chamber independent of both the train pipe and the auxiliary reservoir under reductions of pressure in said train pipe and auxiliary reservoir, substantially as described.

11. In an automatic fluid pressure brake system, the combination with a brake cylinder, a train pipe and an auxiliary reservoir, of valve mechanism having exhaust passages for venting air from the train pipe and brake cylinder, a main piston exposed to train pipe pressure and a valve for controlling said brake cylinder exhaust, an emergency valve and piston for controlling said train pipe exhaust, said emergency valve piston being exposed to train pipe pressure on one side only, and being exposed on its opposite side to stored air pressure within a chamber independent of both the train pipe and auxiliary reservoir under reductions of pressure in said train pipe and auxiliary reservoir, and a supplemental governing valve serving to prevent the local exhaust of train pipe air until the main piston has made its initial movement, substantially as described.

12. In an automatic fluid pressure brake system, the combination with a brake cylinder, a train pipe, and an auxiliary reservoir, of an actuating valve mechanism comprising a casing having exhaust passages for venting air from the train pipe and from the brake cylinder, a main piston and valve for controlling said brake cylinder exhaust, separate valve mechanism for controlling said train pipe exhaust and an exhaust stop valve and its piston exposed to and arranged to be shifted by a reduction of train pipe pressure to cut off the exhaust from the train pipe when the train pipe pressure has been reduced to the required extent, substantially as described.

13. In an automatic fluid pressure brake system, the combination of a casing having an exhaust port or passage for venting air from the train pipe, valve mechanism controlling the escape of air through said port or passage, an exhaust stop valve for checking the flow of air through said port or passage, and a piston for causing said exhaust stop valve to close said passage, said piston being exposed on one side to train pipe pressure and arranged to be shifted by a reduction of said train pipe pressure and being exposed upon its other side to a pressure in opposition to train pipe pressure, substantially as described.

14. In an automatic fluid pressure brake system, the combination of a casing having an exhaust port or passage for venting air from the train pipe, an emergency valve for normally closing said exhaust port or passage, a piston for opening said exhaust port or passage, said piston being exposed on one side to train pipe pressure and upon its opposite side to pressure independent of the train pipe reductions, an exhaust stop valve for closing said port or passage and a piston for bringing said stop valve into action, said piston being exposed on one side to train pipe pressure and arranged to be shifted by a reduction of said train pipe pressure and being exposed upon its other side to a pressure independent of train pipe pressure, substantially as described.

15. In an automatic fluid pressure brake system, the combination of a casing having an exhaust port or passage for venting air from the train pipe, an emergency valve for normally closing said exhaust port or passage, a piston for opening said exhaust port or passage, an exhaust stop valve for closing said port or passage and a piston for bringing said stop valve into action, the said pistons exposing relatively different areas to train pipe pressure and to pressure in opposition thereto, whereby the shift of said emergency valve piston is effected by a considerably less reduction of train pipe pressure than is required to effect the shift of said stop valve piston, substantially as described.

16. In an automatic fluid pressure brake system, the combination of a casing having an exhaust port through which air is vented from the train pipe, a channel leading to said exhaust port, a valve for closing one end of said channel against passage of train pipe air therethrough, a piston for opening said channel and exposed to train pipe pressure, an exhaust stop valve for closing the opposite end of said channel, and a piston for causing said exhaust stop valve to close said channel, said piston being exposed to and arranged to be shifted by a reduction of train pipe pressure, substantially as described.

17. In an automatic fluid pressure brake system, the combination with a casing having suitable admission and exhaust ports or passages therein and having a main piston and valve for controlling the brake cylinder exhaust, of an emergency valve and piston for normally closing the port for escape of air from the train pipe, and an exhaust stop valve and piston for closing said escape port for train pipe air when the predetermined limit of emergency reduction of train pipe pressure has been reached, said stop valve and its piston being carried by said main piston, substantially as described.

18. In an automatic fluid pressure brake system, the combination of a casing having an exhaust port through which air is vented from the train pipe, a channel leading to said exhaust port, a valve for closing one end of said channel against passage of train pipe air therethrough, a piston for opening said channel and exposed to train pipe pressure, and an exhaust stop valve and its piston for closing the opposite end of said channel, both said exhaust stop valve and piston being exposed to train pipe pressure when the adjacent end of said channel is open, and said exhaust stop valve being protected from train pipe pressure when seated to close said channel, substantially as described.

19. In an air brake system, an engineer's valve mechanism comprising a casing having an exhaust port or passage for venting air from the train pipe, valve mechanism controlling the escape of train pipe air through said port or passage, an exhaust stop valve for checking the flow of air through said port or passage, and a piston for causing said exhaust stop valve to close said passage, said piston being exposed on one side to train pipe pressure admitted through said controlling valve mechanism and upon its opposite side to pressure in opposition to said train pipe pressure, substantially as described.

20. In an air brake system, an engineer's valve mechanism comprising a casing having an exhaust port or passage for venting air from the train pipe, valve mechanism controlling the escape of air through said port or passage, an exhaust stop valve for checking the flow of air through said port or passage, a piston for causing said exhaust stop valve to close said passage, said piston being exposed on one side to train pipe pressure, an air chamber connected with the main reservoir, a check valve to prevent the back flow of air from said chamber and a pipe or channel connecting said chamber with a space at the side of said piston not exposed to train pipe pressure, substantially as described.

21. In an air brake system, an engineer's valve mechanism comprising a casing having an exhaust port or passage for venting air from the train pipe, valve mechanism controlling the escape of air through said port or passage, an exhaust stop valve for checking the flow of air through said port or passage, a piston for causing said exhaust stop valve to close said passage, said piston being exposed on one side to train pipe pressure admitted thereto by said controlling valve mechanism and a pipe or channel for admitting substantially uniform stored pressure to the opposite side of said piston, whereby the piston will be shifted when the desired train pipe reduction is effected, substantially as described.

22. In an air brake system, the combination with a main reservoir pipe and with a train pipe, of an interposed valve mechanism having a passage suitably connecting said pipes, a piston fitting snugly within a cylinder of said valve mechanism, a valve operated by said piston and serving to control the passage of fluid between said pipes, one side of said piston being exposed to train pipe pressure and the other side of said piston being exposed to a substantially constant pressure independent of reductions in the main reservoir pressure and acting in opposition to said train pipe pressure, whereby when the pressure upon opposite sides of said piston is equal said controlling valve will remain open, but when the pressure within the train pipe decreases, the substantially constant pressure acting upon the opposite side of said piston will cause said valve to automatically close, substantially as described.

23. In an air brake system, the combination with a main reservoir pipe and with a train pipe, of an interposed valve mechanism having a passage suitably connecting said pipes, a piston fitting snugly within a cylinder of said valve mechanism, a valve connected to said piston and serving to control the passage of fluid between said pipes, one side of said piston being normally exposed to stored fluid pressure within a chamber connected to a pipe leading from the main reservoir but guarded against reductions of pressure within said main reservoir, and the other side of said piston being exposed to the fluid pressure within the train pipe; whereby when the pressure upon opposite sides of said piston is equal, said controlling valve will remain open, but when the pressure within the train pipe decreases, the stored fluid pressure acting upon the opposite side of said piston will cause said controlling valve to automatically close, substantially as described.

24. In an air brake system, the combination with a main reservoir pipe and with a train pipe, of an interposed valve mechanism having a passage suitably connecting said pipes, a piston fitting snugly within a cylinder of said valve mechanism, a valve connected to said piston and serving to control the passage of fluid between said pipes, one side of said piston being exposed to a fluid pressure within the train pipe and the other side of said piston being exposed to a substantially constant pressure in opposition to said train pipe pressure and independent of reductions of pressure in the main reservoir, said casing being provided also with another passage leading to the train pipe and independent of said controlling valve and a three-way cock or valve for determining the flow of fluid through the independent passages that lead to the train pipe, substantially as described.

25. In an air brake system, the combination with a main reservoir pipe and with a train pipe, of an interposed valve mechanism comprising a casing having a piston fitting snugly within a cylinder, the space at one side of said piston being connected by suitable channels with the main reservoir pipe and the space at the opposite side of said piston being connected by a suitable channel with the train pipe, a further passage or channel connecting the train pipe and the main reservoir pipe, a valve operated by said piston and serving to control the passage that leads from the main reservoir pipe to that side of the piston to which the train pipe is connected whereby when fluid pressure upon said side of the piston decreases, the passage from said main reservoir pipe to said side of the piston will be closed, and a cock or valve interposed in the direct passage between the main reservoir pipe and the train pipe whereby the direct flow of fluid between said pipes may be controlled, substantially as described.

B. FRANK. TEAL.

Witnesses:
GEO. P. FISHER, Jr.,
FRED GERLACH.